Patented Aug. 9, 1927.

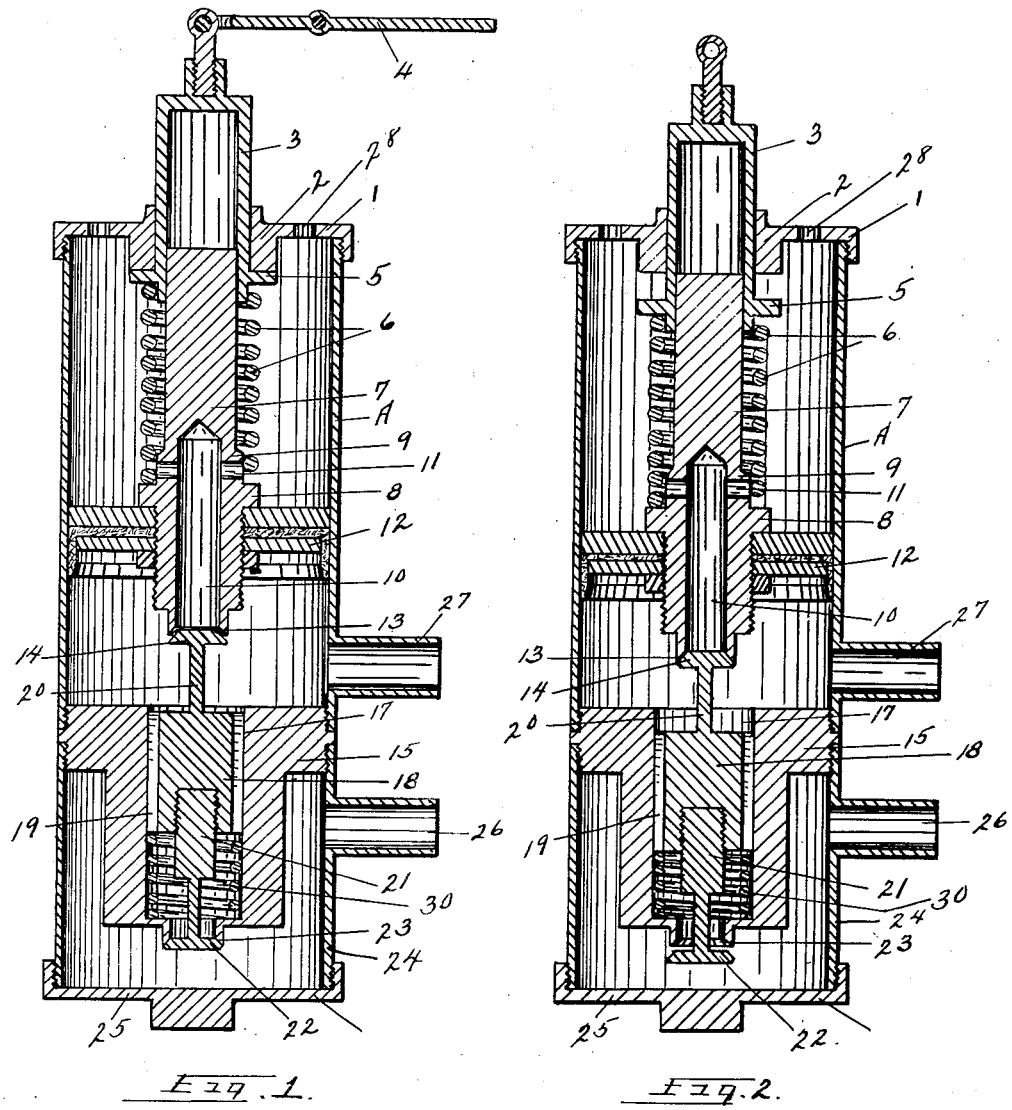

1,638,405

UNITED STATES PATENT OFFICE.

ROBERT E. MITTON, OF SALT LAKE CITY, UTAH.

PISTON VALVE FOR THE CONTROL OF FLUIDS.

Application filed July 3, 1926. Serial No. 120,346.

My invention relates to valves and has for its object to provide a new and efficient valve for the control of fluids.

A further object is to provide a new valve for the control of air used in air brakes.

A still further object is to provide an efficient quick acting control valve for the air brakes on an automobile or road vehicle and one which will apply a large or small amount of air as desired by the operator of the vehicle when slowing down or stopping quickly.

These objects I accomplish with the valve shown in the accompanying drawing in which similar numerals and letters of reference indicate like parts throughout the several views and as described in the specification forming a part of this application and pointed out in the appended claim.

In the drawings of which I have shown the best and most preferred manner of building my invention, Figure 1 is a diametrical cross section of the valve. Figure 2 is a diametrical cross section showing the valves operated allowing air to enter the desired direction.

In the drawings I have shown my valve as A, and which consists of a cylindrical casing having a cap 1 on one end thereof. The said cap 1 has a central shoulder 2 formed thereon and which shoulder is centrally bored to receive a cylindrical housing 3. One end of said housing 3 is secured to a lever or operating bar 4 by which the valve is operated. The other end of the said housing 3 is flanged to form a base 5 on and against which a spring 6 is carried. A shaft 7 has one end slidably carried within the said housing 3 and has a shoulder 8 formed near the other end. The said spring 6 is carried on the said shaft 7 with one end bearing against the said base 5 and the other against the shoulder 8. The end of the said shaft 7 is slightly enlarged, as at 9, and is centrally bored, as at 10, to form an air passage. Ports 11 are cut in the wall of the shaft 7 from the bore 10 to allow passage of air therethrough. The free end of said shaft 7 is externally threaded to receive a suitably packed piston 12, which piston is slidably carried within the said casing A and is actuated by the pressure created therein. A valve seat 13 is cut in the end of the shaft 7 and a valve 14 seats therein. The end of the said casing A is internally threaded and a member 15 is screwed therein. The said member 15 is cylindrical in form with one end of smaller diameter than the portion which is screwed into the casing A, and the entire member is centrally bored, as at 17, to form a guide in which a guide member 18 is slidably and operatively carried. The said guide member 18 has mill cuts 19 cut longitudinally in the sides thereof to form air passages therethrough. A valve stem 20 is formed on one end of said guide member 18 and has the said valve 14 formed on the free end. The said valve 14 seats in the said valve seat 13 when the valve is being operated. The other end of the said guide member 18 is centrally bored and threaded to receive a valve stem 21 on which stem 21 a valve 22 is formed and operated by the movement of the guide member 18. One end of the said bore 17 is partially closed and has a valve seat 23 cut therein, in which seat the said valve 22 is normally seated. A spring 30 is carried between the end of the guide member 18 and the closed end of the member 15 to hold the valve 22 normally closed. A cylindrical casing 24 of the same diameter as the casing A is screwed onto the member 15 and has a closure cap 25 screwed thereon. A cylindrical air connection 26 is formed on one side of the said cylindrical casing 24 and is connected with the air supply tank, not shown. Another air connection 27 is secured to the said casing A and is to be connected with the air lines leading to the place where the air is to be used for power. Ports 28 are cut in the closure cap 1 to allow passage of air therethrough.

The operation of my valve is as follows, and, as my device is primarily for use with automobile brakes, I will describe it as such: When air is desired in the brakes of the automobile, the lever 4 is pushed and the housing 3 is moved down against the spring 6; as the spring is compressed it will transmit some of the power to the piston 12, which will be moved longitudinally in the casing A and the valve seat 13 will be brought down against the valve 14 and the seat will be closed. As the lever is pressed down farther the valve 14 and the stem 20 will be moved and they will move the guide 18 and the valve stem 21, opening the valve 22 from its seat 23 and compressing the spring 30. Air will then enter through the connection 26 and around the valve 22, by the spring 30, through the mill cuts 17, and will pass out through the connection 27 to be used as power wherever necessary in automobile brakes or other places. When sufficient air has passed through the connection 27 to operate the brakes back pressure will be created in the lines leading to the brakes and the back pressure will force the piston 12 upwardly in the casing A and the spring 6 will be compressed and the spring 30 will close the valve 22 in its seat 23 and the supply of air will be shut off. Large or small amounts of air may thus be utilized with this valve and the amounts may be judged to the fraction of a pound. As will be obvious, when the air supply is shut off and the valve 14 opened, the air in the lines will pass out through the connection 27, through the bore 10, and the ports 11 and 28, to the open air, and all pressure will be released from the brakes.

Having thus described my invention I desire to secure by Letters Patent and claim:

In a valve the combination of a casing; a cap on one end of said casing; a central opening in said cap and having a shoulder formed therearound; a housing slidably operable in said opening; a shaft carried within said housing and connected with a piston carried in said casing; a spring around said shaft to regulate the movement of said piston; a central bore in said shaft and having ports in the side walls of said bore; a guide member in the other end of said casing; a guide carried in said guide member; a valve carried on one end of said guide and adapted to close the bore in said shaft when said piston is moved; a valve seat in the other end of said guide member; another valve secured to said guide and adapted to close the seat in the said guide member; a spring to hold the last mentioned valve normally seated; an air connection in said casing; another casing similar to the first mentioned casing having an air connection in one wall thereof, and a closure cap for the open end of said second mentioned casing.

In testimony whereof I have affixed my signature.

ROBERT E. MITTON.